(12) United States Patent
Jeng (10) Patent No.: US 10,439,754 B2
(45) Date of Patent: Oct. 8, 2019

(54) METHODS AND APPARATUS TO IMPLEMENT A THIRD-ORDER SIGNAL SCRAMBLER

(71) Applicant: The Boeing Company, Chicago, IL (US)

(72) Inventor: Isaac M. Jeng, Yorba Linda, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/474,499

(22) Filed: Mar. 30, 2017

(65) Prior Publication Data

US 2017/0302400 A1  Oct. 19, 2017

Related U.S. Application Data

(63) Continuation-in-part of application No. 15/098,083, filed on Apr. 13, 2016.

(51) Int. Cl.
| | | |
|---|---|---|
| *H04K 1/02* | (2006.01) | |
| *H04L 25/03* | (2006.01) | |
| *H04L 29/06* | (2006.01) | |
| *H04K 1/04* | (2006.01) | |

(52) U.S. Cl.
CPC .............. *H04K 1/02* (2013.01); *H04K 1/04* (2013.01); *H04L 25/03866* (2013.01); *H04L 63/0428* (2013.01)

(58) Field of Classification Search
CPC ...... H04K 1/02; H04K 1/04; H04L 25/03866; H04L 63/0428
See application file for complete search history.

(56) References Cited

U.S. PATENT DOCUMENTS

| | | |
|---|---|---|
| 3,162,729 A | 12/1964 | Holt |
| 3,290,667 A | 12/1966 | Stine |
| 3,748,589 A | 7/1973 | Miller |
| 4,129,832 A | 12/1978 | Neal et al. |
| 4,617,594 A | 10/1986 | Katagiri et al. |
| 4,646,032 A | 2/1987 | Wheatley, III et al. |
| 4,684,903 A | 8/1987 | Hunt et al. |

(Continued)

OTHER PUBLICATIONS

United States Patent and Trademark Office, "Non-Final Office Action," issued in connection with U.S. Appl. No. 15/098,083, dated Apr. 6, 2018, 14 pages.

(Continued)

*Primary Examiner* — Hee K Song
(74) *Attorney, Agent, or Firm* — Hanley, Flight & Zimmerman, LLC (57) ABSTRACT

Methods, apparatus, systems, and articles of manufacture to implement a third-order signal scrambler are disclosed. An example apparatus includes a controlled scramble generator to generate a controlled random sequence based on one or more subcarriers and a random pulse sequence, the random pulse sequence based on an output of a random number generator processed by a multi-order sinusoidal noise function. The example apparatus further includes a sequence modifier to form an output sequence by combining a source sequence with the controlled random sequence, the controlled random sequence to modify a characteristic of the source sequence in a frequency domain.

20 Claims, 6 Drawing Sheets

(56) References Cited

U.S. PATENT DOCUMENTS

| | | | |
|---|---|---|---|
| 4,791,390 A * | 12/1988 | Harris | H03H 21/0012 |
| | | | 333/166 |
| 4,888,799 A | 12/1989 | Mobley et al. | |
| 5,355,171 A | 10/1994 | Miyazaki et al. | |
| 5,986,512 A * | 11/1999 | Eriksson | H03L 7/1976 |
| | | | 331/16 |
| 6,611,567 B1 | 8/2003 | Balakrishnan et al. | |
| 2002/0099942 A1 | 7/2002 | Gohl | |
| 2004/0090802 A1 * | 5/2004 | Pourseyed | H02M 3/156 |
| | | | 363/39 |
| 2007/0230701 A1 | 10/2007 | Park et al. | |
| 2008/0205552 A1 * | 8/2008 | Sartori | H04L 1/06 |
| | | | 375/316 |
| 2010/0027608 A1 | 2/2010 | Priotti | |
| 2011/0255453 A1 | 10/2011 | Roh et al. | |
| 2014/0071936 A1 | 3/2014 | Zhang et al. | |
| 2014/0355408 A1 | 12/2014 | Tong et al. | |
| 2015/0116563 A1 | 4/2015 | Herman et al. | |
| 2017/0055242 A1 | 2/2017 | Kusashima et al. | |
| 2017/0257203 A1 | 9/2017 | Tong et al. | |

OTHER PUBLICATIONS

United States Patent and Trademark Office, "Non Final Office Action", dated Feb. 8, 2019, in connection with U.S. Appl. No. 15/098,083 (8 pages).

"Orthogonal Frequency Division Modulation" (OFDM) article dated Nov. 28, 2011, [https://www.csie.ntu.edu.tw/~hsinmu/courses/_media/wn 11fall/ofdm.pdf], 21 pages.

"Chapter 2: Air Interface Concepts: 2.2 Orthogonal Frequency Division Modulation," article dated Jul. 8, 2009, [https://m.eet.com/media/1072708/LTE_Chapter2_29to38.pdf], 10 pages.

United States Patent and Trademark Office, "Final Office action," issued in connection with U.S. Appl. No. 15/098,083 dated Oct. 19, 2018, 10 pages.

United States Patent and Trademark Office, "Notice of Allowance," dated Jul. 1, 2019, in connection ith U.S. Appl. No. 15/098,083 (8 pages).

* cited by examiner

METHODS AND APPARATUS TO IMPLEMENT A THIRD-ORDER SIGNAL SCRAMBLER

RELATED APPLICATION

This patent arises from a continuation-in-part of U.S. application Ser. No. 15/098,083, entitled "METHODS AND APPARATUS TO IMPLEMENT A SIGNAL SCRAMBLER", which was filed on Apr. 13, 2016 and is hereby incorporated herein by reference in its entirety.

FIELD OF THE DISCLOSURE

This disclosure relates generally to signal processing and, more particularly, to methods and apparatus to implement a third-order signal scrambler.

BACKGROUND

Communications equipment, such as private mobile phones, private Intranet signals, pay television signals, etc., frequently include circuits for tracking the phase or frequency of a received signal. This tracking circuit can be as fundamental as a phase-locked loop designed with a capability to track the received signal within specified limits of random variation of the signal phase and/or signal frequency.

SUMMARY

An example apparatus includes a controlled scramble generator to generate a controlled random sequence based on one or more subcarriers and a random pulse sequence, the random pulse sequence based on an output of a random number generator processed by a multi-order sinusoidal noise function. The example apparatus further includes a sequence modifier to form an output sequence by combining a source sequence with the controlled random sequence, the controlled random sequence to modify a characteristic of the source sequence in a frequency domain.

An example method includes generating a controlled random sequence based on one or more subcarriers and a random pulse sequence, the random pulse sequence based on an output of a random number generator processed by a multi-order sinusoidal noise function. The example method further includes forming an output sequence by combining a source sequence with the controlled random sequence, the controlled random sequence to modify a characteristic of the source sequence in a frequency domain.

An example tangible machine-readable storage medium comprising instructions that, when executed, cause a machine to at least generate a controlled random sequence based on one or more subcarriers and a random pulse sequence, the random pulse sequence based on an output of a random number generator processed by a multi-order sinusoidal noise function, and form an output sequence by combining a source sequence with the controlled random sequence, the controlled random sequence to modify a characteristic of the source sequence in a frequency domain.

BRIEF DESCRIPTION OF THE DRAWINGS

Wherever possible, the same reference numbers will be used throughout the drawing(s) and accompanying written description to refer to the same or like parts.

DETAILED DESCRIPTION

Disclosed examples facilitate generating a controlled random process that varies the phase and/or frequency of an oscillatory sequence (sometimes referred to as a "signal") and which may be consistently reconstructed. In some examples, the reconstruction process may be generated and used at a remote receiving device to remove the controlled random sequence phase and/or frequency oscillation from a received sequence.

Examples disclosed herein are directed to communications equipment associated with tracking circuits that track the phase and/or frequency of a received sequence. For example, disclosed examples implement a controlled scramble sequence to modify the phase, frequency and/or amplitude of a sequence to prevent intercepting and/or jamming the sequence. By implementing the controlled scramble sequence, scrambling of private mobile phone signals, scrambling of private intranet signals, encoding of pay television signals, etc. may be conducted so that a reception of such signals would not only require a user or system to obtain necessary unscrambling circuitry, but also require a valid code to decode the signals. In some instances, without either the unscrambling circuitry or the valid code, an unauthorized user or system may not recover the signals.

In some examples, a transmitting device and/or a receiving device generates a controlled scramble sequence and applies the controlled scramble sequence to modify the input sequence. For example, a transmitting device may apply the controlled scramble sequence to a source sequence to scramble the source sequence prior to transmission. In other examples, a receiving device may apply the controlled scramble sequence to a received sequence to unscramble (e.g., reconstruct) the source sequence from the received sequence.

Examples disclosed herein generate a controlled scramble sequence by filtering a random pulse sequence generated by a random number generator. In some examples, the seed value provided to the random number generator is password protected. In such instances, an unauthorized user attempting to access a source sequence is required to know the password and access software and/or hardware to unscramble the source sequence. In the illustrated examples, the output of the filter is a square-pulse sequence that, when applied to an input sequence (e.g., a source sequence or a received sequence), modifies the input sequence to exhibit characteristics similar to third-order noise (e.g., third-order frequency noise, third-order phase noise, etc.). For example, the spectral behavior of the third-order phase noise may have a defined power spectral density asymptote (e.g., a single-sideband straight-line asymptote) of −60 dB/decade, while a random-frequency-walk noise may have a defined single-sideband straight-line asymptote of −40 dB/decade. To further increase the complexity of the modified sequence, disclosed examples may modify the square-pulse sequence output by the filter with one or more square-pulse subcarriers that enable varying the shape of the frequency characteristic of the square-pulse sequence output and/or up-convert to vary the location of the sequence in the frequency domain. Alternatively, disclosed examples may (1) modify the square-pulse sequence output by the filter without a square-pulse subcarrier, or (2) not modify the square-pulse sequence output by the filter.

Figure 1:
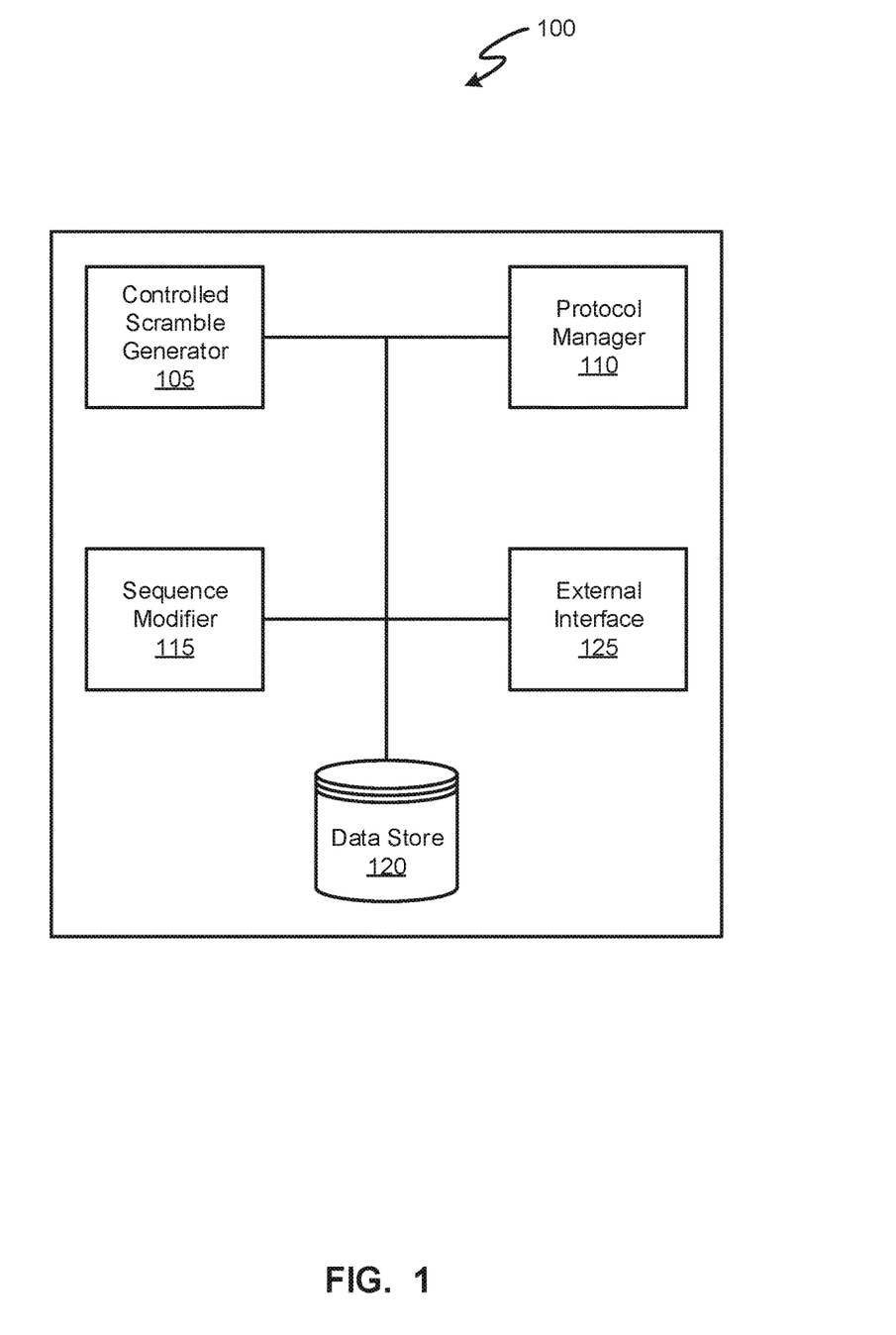
FIG. 1 is a block diagram of an example apparatus within which the teachings of this disclosure may be implemented.

FIG. 1 is a block diagram of an example apparatus 100 that may be implemented by a tracking circuit. The example apparatus 100 of FIG. 1 includes an example controlled scramble generator 105, an example protocol manager 110, an example sequence modifier 115, an example data store 120 and an example external interface 125. In the illustrated example of FIG. 1, the example apparatus 100 includes the example controlled scramble generator 105 to generate a controlled scramble sequence to vary the amplitude, frequency and/or phase of a sequence. In some examples, the controlled scramble sequence may be applied to a source sequence to scramble the source sequence prior to transmission to one or more receiving devices. In some examples, the controlled scramble sequence may be applied to a received sequence to unscramble the received sequence (e.g., to reconstruct the source sequence).

By applying the controlled scramble sequence to a source sequence, the scrambled sequence exhibits characteristics of third-order phase noise. Phase noise can be defined in either the frequency domain or in the time domain. When defined in the frequency domain, the phase noise is described in terms of its power spectral density (S(f)). When defined in the time domain, the phase noise is described either by frequency variance versus averaging time or by phase variance versus averaging time. The third-order phase noise has a power spectral density and is defined in Equation 1.

$$S(f) = \frac{K_{-2}}{f^6}$$ Equation 1

In Equation 1 above, the power spectral density (S(f)) is defined as the ratio of a scale factor (K) and frequency (f). In the illustrated example, the scale factor (K) is measured in radians per second per volt.

The example controlled scramble generator 105 of FIG. 1 generates the controlled scramble sequence by applying a filter to an output of a random number generator and applying one or more subcarrier(s) to the output of the filter. As disclosed herein, applying the one or more subcarrier(s) to the output of the filter facilitates varying the shape and/or the location in the frequency domain of the scrambled sequence. Varying the shape and/or the location of the scrambled sequence may be beneficial for preventing intercepting of the scrambled sequence, jamming the sequence, etc. Alternatively, the example controlled scramble generator 105 may not apply a subcarrier to the output of the filter.

In the illustrated example of FIG. 1, the example apparatus 100 includes the example protocol manager 110 to control when to apply the controlled scramble sequence to a source sequence (e.g., to scramble the source sequence) and/or a received sequence (e.g., to reconstruct the source sequence). The example protocol manager 110 may include and/or access a clock to synchronize with one or more receiving device(s). When the apparatus 100 is transmitting a message, the example protocol manager 110 instructs a receiving device when to activate the scramble protocol (e.g., apply the controlled scramble sequence to reconstruct a received sequence) or to deactivate the scramble protocol (e.g., stop applying the controlled scramble sequence to a received sequence). In the illustrated example, when the scramble protocol is activated, the protocol manager 110 instructs the example sequence modifier 115 to apply the controlled scramble sequence to a source sequence to scramble the source sequence or to apply the controlled scramble sequence to a received sequence to reconstruct the source sequence.

In the illustrated example, the protocol manager 110 provides a seed (e.g., an input) to the controlled scramble generator 105 when the scramble protocol is activated. To further improve security, the example protocol manager 110 password protects the seed. For example, a user may be required to provide a passcode (e.g., "0123") to activate the scramble protocol. In the illustrated example, the protocol manager 110 generates a seed based on the passcode to provide to the controlled scramble generator 105. For example, the protocol manager 110 may generate a seed by increasing each value in a provided passcode by one and provide the generated seed (e.g., "1234") to the controlled scramble generator 105 to generate the controlled scramble sequence. In the illustrated example, when the transmitting device and the receiving device input the same passcode, the same seed value is generated and, thus, the same controlled scramble sequence is generated to facilitate scrambling and reconstructing the source sequence. In some examples, the protocol manager 110 may provide a seed to the controlled scramble generator 105 only when the passcode is correct. In some such examples, the protocol manager 110 may retrieve a reference passcode from the example data store 120 to verify against the received passcode.

In the illustrated example of FIG. 1, the apparatus 100 includes the example sequence modifier 115 to scramble and/or unscramble a sequence. For example, when transmitting a sequence, the sequence modifier 115 may generate a scrambled sequence by adding the controlled scramble sequence to a source sequence. Additionally or alternatively, when the apparatus 100 receives a sequence for processing, the example sequence modifier 115 may reconstruct the source sequence by removing the controlled scramble sequence from the received (e.g., scrambled) sequence. In the illustrated example, the sequence modifier 115 determines whether to modify the source sequence or the scrambled sequence based on input provided by the example protocol manager 110. In some examples, the sequence modifier 115 implements a time-delay based on the input provided by the example protocol manager 110. For example, the sequence modifier 115 may wait a randomly determined or a pre-determined amount of time (e.g., 10 seconds) prior to modifying the source sequence or the scrambled sequence when the sequence modifier 115 receives the input. The example sequence modifier 115 may implement a time-delay to ensure the apparatus 100 on a transmitting device and/or a receiving device is/are operational. An example implementation of the sequence modifier 115 is an oscillator (e.g., a voltage-controlled oscillator). However, other circuits for modifying a sequence may additionally or alternatively be used.

In the illustrated example of FIG. 1, the apparatus 100 includes the example data store 120 to store data used by and/or generated by the controlled scramble generator 105, the protocol manager 110 and/or the sequence modifier 115. The example data store 120 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example data store 120 may additionally or alternatively be implemented by one or more double data rate (DDR) memories, such as DDR, DDR2, DDR3, mobile DDR (mDDR), etc. The example data store 120 may additionally or alternatively be implemented by one or more mass storage devices such as hard disk drive(s), compact disk drive(s), digital versatile disk drive(s), etc. While in the illustrated example the data store 120 is illustrated as a single database, the data store 120 may be implemented by any number and/or type(s) of databases. Furthermore, the data stored in the data store 120 may be in any data format such as, for example, binary data, comma delimited data, tab delimited data, structured query language (SQL) structures, etc.

In the illustrated example of FIG. 1, the apparatus 100 includes the example external interface 125 to facilitate communication with other communication devices. For example, the external interface 125 may include one or more transmitter(s), one or more receiver(s), one or more transceiver(s), one or more antenna or antennae, etc. to transmit and/or receive sequences. The example external interface 125 may include a wireless interface to wirelessly communicate with other devices and/or a wired interface to communicate with other devices over a wire.

While an example manner of implementing the apparatus 100 is illustrated in FIG. 1, one or more of the elements, processes and/or devices illustrated in FIG. 1 may be combined, divided, re-arranged, omitted, eliminated, and/or implemented in any other way. Further, the example controlled scramble generator 105, the example protocol manager 110, the example sequence modifier 115, the example data store 120, the example external interface 125 and/or, more generally, the example apparatus 100 of FIG. 1 may be implemented by hardware, software, firmware, and/or any combination of hardware, software, and/or firmware. Thus, for example, any of the example controlled scramble generator 105, the example protocol manager 110, the example sequence modifier 115, the example data store 120, the example external interface 125 and/or, more generally, the example apparatus 100 of FIG. 1 could be implemented by one or more analog or digital circuit(s), logic circuits, programmable processor(s), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example controlled scramble generator 105, the example protocol manager 110, the example sequence modifier 115, the example data store 120, the example external interface 125 and/or, more generally, the example apparatus 100 of FIG. 1 is/are hereby expressly defined to include a tangible computer readable storage device or storage disk such as a memory, a digital versatile disk (DVD), a compact disk (CD), a Blu-ray disk, etc. storing the software and/or firmware. Further still, the example apparatus 100 of FIG. 1 may include one or more elements, processes, and/or devices in addition to, or instead of, those illustrated in FIG. 1, and/or may include more than one of any or all of the illustrated elements, processes, and devices.

Figure 2:
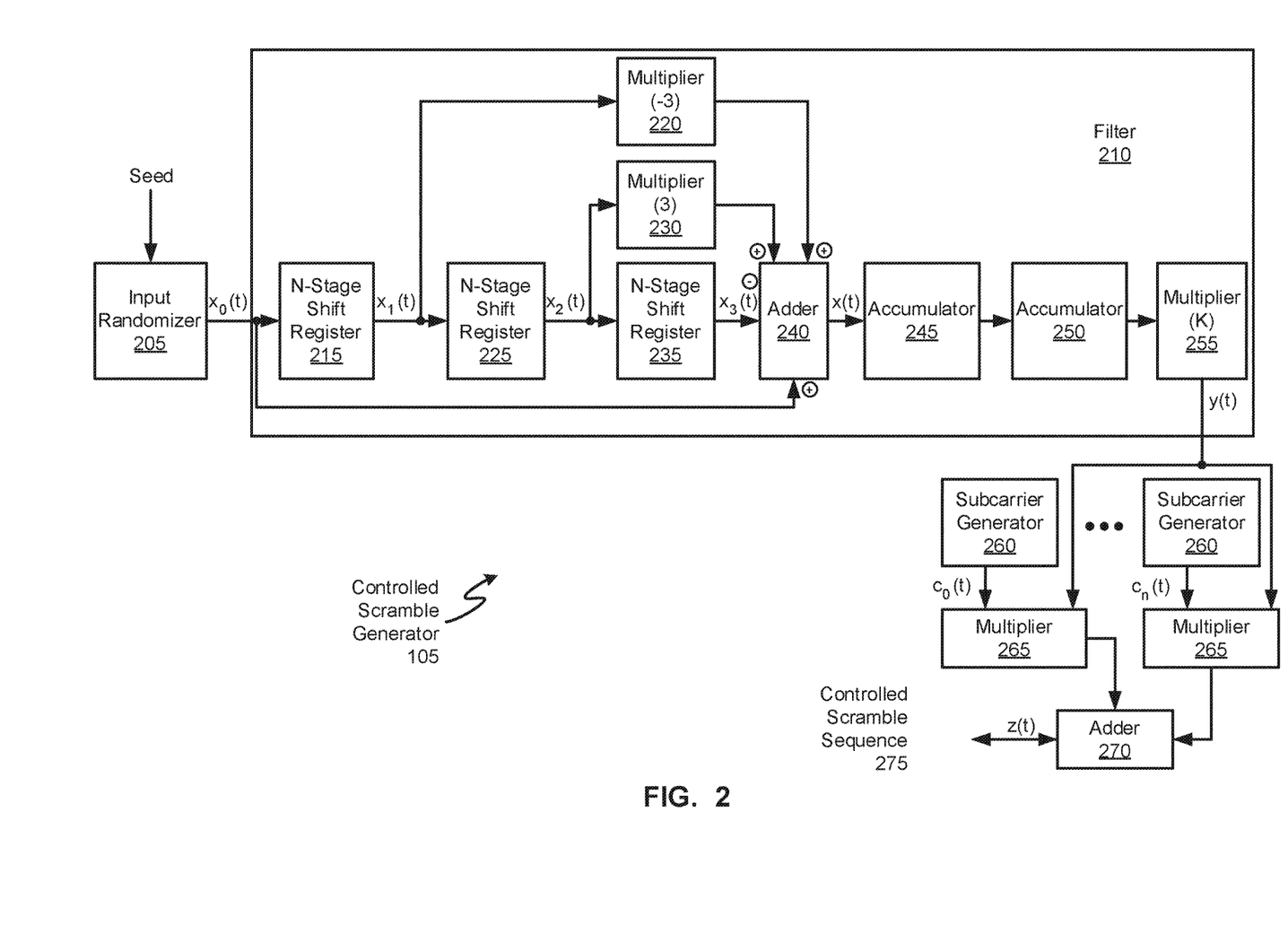
FIG. 2 is a block diagram of an example implementation of the controlled scramble generator of FIG. 1.

FIG. 2 is an example implementation of the controlled scramble generator 105 of FIG. 1. The example controlled scramble generator 105 generates a controlled scramble sequence 275 having characteristics that are predetermined and controllable so that a source sequence modified by the controlled scramble sequence may be consistently reconstructed from a scrambled sequence (e.g., a controlled random process). The example controlled scramble generator 105 of FIG. 2 includes an example input randomizer 205, an example filter 210, one or more example subcarrier generator(s) 260, one or more corresponding example multiplier(s) 265 and an example adder 270.

In the illustrated example of FIG. 2, the example controlled scramble generator 105 includes the input randomizer 205 to generate a random square-pulse ($x_0(t)$) that is provided to the filter 210. In the illustrated example, the random square-pulse sequences ($x_0(t)$) generated by the input randomizer 205 are based on the seed provided by the protocol manager 110 of FIG. 1. Each random square-pulse ($x_0(t)$) has the same magnitude of a previous random square-pulse but has a random polarity value (e.g., +1 or −1) at sampling period (T) seconds. The input randomizer 205 may use any known random number generation techniques such as a uniform random number generator.

In the illustrated example of FIG. 2, the filter 210 receives as input the random square-pulse sequence ($x_0(t)$), and outputs an output square pulse sequence ($y(t)$). Accordingly, the filter 210 may be described by the transfer function ($H(s)$) defined in Equation 2.

$$H(s) = \frac{Y(s)}{X_0(s)}, \quad \text{Equation 2}$$

where s is the kernel of the Laplace Transform.

In Equation 2 above, the transfer function ($H(s)$) is the ratio of the output ($Y(s)$) of the filter 210 and the input ($X_0(s)$) to the filter 210.

In the illustrated example of FIG. 2, the filter 210 includes example N-stage shift registers 215, 225, 235, example multipliers 220, 230, 255, an example adder 240, and example accumulators 245, 250. The example N-stage shift registers 215, 225, 235 delay an input sequence by N periods. In the illustrated example, the first N-stage shift register 215 time-delays the random square-pulse sequence ($x_0(t)$) and outputs a first delayed sequence ($x_1(t)$). The first delayed sequence ($x_1(t)$) is a version of the random square-pulse sequence ($x_0(t)$) that has been time-delayed for N periods (e.g., N*T seconds). Likewise, the output of the second N-stage shift register 225 is a second delayed sequence ($x_2(t)$) that represents a version of the random square-pulse sequence ($x_0(t)$) that has been time-delayed for 2N periods (e.g., 2*N*T seconds). Similarly, the output of the third N-stage shift register 235 is a third delayed sequence ($x_3(t)$) that represents a version of the random square-pulse sequence ($x_0(t)$) that has been time-delayed for 3N periods (e.g., 3*N*T seconds).

Using Laplace transform notation, the output ($x_1(t)$) of the first N-stage shift register 215 can be defined using Equation 3.

$$X_1(s) = e^{-NTs} * X_0(s), \quad \text{Equation 3:}$$

note that (*) denotes scalar multiplication

The output ($x_2(t)$) of the second N-stage shift register 225 can be defined using Equation 4.

$$X_2(s) = e^{-2NTs} * X_0(s) \qquad \text{Equation 4:}$$

The output ($x_3(t)$) of the third N-stage shift register 235 can be defined using Equation 5.

$$X_3(S) = e^{-3NTs} * X_0(s) \qquad \text{Equation 5:}$$

In Equations 3, 4, and 5 above, the symbol for the number of stages (N) is a preselected positive constant, the symbol (T) is a sampling period in seconds, and (s) is the kernel of the Laplace transform.

In the illustrated example of FIG. 2, the filter 210 includes the adder 240 to perform linear addition on inputs. In the illustrated example, the adder 240 calculates a sum (x(t)) of the random square-pulse sequence ($x_0(t)$), the first delayed sequence ($x_1(t)$), the second delayed sequence ($x_2(t)$), and the third delayed sequence ($x_3(t)$). The example first delayed sequence ($x_1(t)$) is scaled by a constant factor (e.g., −3) prior to input to the adder 240. The example second delayed sequence ($x_2(t)$) is scaled by a constant factor (e.g., 3) prior to input to the adder 240. Although not shown, the example third delayed sequence ($x_3(t)$) is scaled by a constant factor (e.g., −1) prior to input to the adder 240. The sum (x(t)) output by the adder 240 may defined using Equation 6.

$$X(s) = X_0(s) + (-3 * X_1(s)) + (3 * X_2(S)) + (-1 * X_3(s)) \qquad \text{Equation 6:}$$

Equation 6 above can be rewritten as Equation 7 after substituting Equations 3, 4, and 5 into Equation 6 and rearranging some terms.

$$X(s) = X_0(s)[1 - e^{-NTs}]^3 \qquad \text{Equation 7:}$$

The first example accumulator 245 receives the sum (x(t)) provided by the adder 240 and accumulates (e.g., sums) the values over a period and releases the accumulated value at the end of the period. The second example accumulator 250 receives the accumulated value from the first example accumulator 245 and additionally accumulates the values received from the first example accumulator 245 over a period and releases the accumulated value at the end of the period. The output of the accumulators 245, 250 may defined using Equation 8. In the illustrated example, the accumulators 245, 250 reset their values to zero at the start of each accumulation period.

$$\frac{X(s)}{s^2} = \frac{X_0(s)[1 - e^{-NTs}]^3}{s^2} \qquad \text{Equation 8}$$

In Equation 8 above, the output of the example accumulators 245, 250 is described using Laplace transform notation. In the illustrated example of FIG. 2, the output of the accumulator 250 is scaled by a factor (K) by the example multiplier 255. The output of the filter 210 can be defined using Equation 9. In Equation 9 below, the output of the example filter 210 is described using Laplace transform notation.

$$Y(s) = K \frac{X_0(s)[1 - e^{-NTs}]^3}{s^2} \qquad \text{Equation 9}$$

A change in frequency to a sequence based on the output (y(t)) of the filter 210 is equivalent to the first derivative of the output (y(t)) with respect to time and is shown in Equation 10.

$$\Delta f = \frac{\delta}{\delta t} y(t) \qquad \text{Equation 10}$$

Equation 10 above can be rewritten using Laplace transform notation and is shown in Equation 11.

$$L\{\Delta f\} = L\left\{\frac{\delta}{\delta t} y(t)\right\} = \frac{K X_0(s)[1 - e^{-NTs}]^3}{s} \qquad \text{Equation 11}$$

In Equation 11 above, the symbol (L) represents the Laplace operator. Equation 11 is rewritten as a transfer function in Equation 12.

$$\frac{L\{\Delta f\}}{X_0(s)} = \frac{K[1 - e^{-NTs}]^3}{s} \qquad \text{Equation 12}$$

With respect to Equation 12 above, because the transfer function is a stationary process as described below in Equation 13, the frequency variant portion of the transfer function for the filter can be expressed using Equation 14.

$$X_0(t + T) = X_0(t) \qquad \text{Equation 13}$$

$$\frac{L\{\Delta f\}}{X_0(s)} = K \frac{[1 - e^{-NTs}]^3}{s[1 - e^{-Ts}]} \qquad \text{Equation 14}$$

Denoting $X_0(s) = v$, the transfer function of the filter 210 can be expressed using Equation 15, where the symbol ($\Delta f$) is the change in frequency based on y(t).

$$\frac{L\{\Delta f\}}{v} = \frac{[1 - e^{-NTs}]^3}{1 - e^{-Ts}} \qquad \text{Equation 15}$$

In the illustrated example, the output (y(t)) of the filter 210 is an output square-pulse sequence. The autocorrelation function for the output square-pulse sequence (y(t)) can be defined using Equations 16, 17, 18, and 19.

$$R_\phi(0 \le \tau \le NT) = \qquad \text{Equation 16}$$
$$R_\phi(0)\left[1 - \frac{10\tau^2}{11(NT)^2} + \frac{5\tau^4}{11(NT)^4} - \frac{5\tau^5}{33(NT)^5}\right] radians^2$$

and $$R_\phi(NT \le \tau \le 2NT) = \qquad \text{Equation 17}$$
$$R_\phi(0)\left[\frac{17}{22} + \frac{25\tau}{22(NT)} - \frac{35\tau^2}{11(NT)^2} + \frac{25\tau^3}{11(NT)^3} - \frac{15\tau^4}{22(NT)^4} + \frac{5\tau^5}{66(NT)^5}\right] radians^2$$

$$R_\phi(2NT \le \tau \le 3NT) = \qquad \text{Equation 18}$$
$$R_\phi(0)\left[\frac{81}{22} - \frac{135\tau}{22(NT)} + \frac{45\tau^2}{11(NT)^2} - \frac{15\tau^3}{11(NT)^3} + \frac{5\tau^4}{22(NT)^4} - \frac{5\tau^5}{66(NT)^5}\right] radians^2$$

-continued and $$R_\phi(\tau > 3NT) = 0 \text{ radians}^2 \quad \text{Equation 19}$$

In Equations 16, 17, 18 and 19 above, the symbol (c) represents the autocorrelation interval of the output square-pulse sequence (y(t)). The mean square power of the phase variation of the output square-pulse sequence (y(t)) is defined using Equation 20.

$$R_\phi(\tau = 0) = \frac{11}{10}\sqrt{\frac{\pi}{2}} PK^2N^5 \text{ radians}^2 \quad \text{Equation 20}$$

The power spectral density function of the output square-pulse sequence (y(t)) is defined using a sinc function in Equation 21.

$$S(\omega) = PTK^2N^6 \frac{\sin^6\left(\frac{NT\omega}{2}\right)}{\left(\frac{NT\omega}{2}\right)^6} \quad \text{Equation 21}$$

In Equation 21 above and with reference to the filter 210, the symbol (K) is a constant multiplier to the frequency step size and is measured in radians per second per volt. The symbol (N) is a dimensionless, positive integer and represents the length of the N-stage shift registers 215, 225, 235. The symbol (P) represents the normalized input power of the input randomizer 205. The symbol (ω) represents the sampling period and is measured in seconds. The symbol (w) represents the frequency in radians per second. Accordingly, the output square-pulse sequence (y(t)) is based on (e.g., can be controlled by) the values of the constant (K), the positive integer (N) and the sampling period (T).

The autocorrelation function for the frequency (e.g., the second derivative of the autocorrelation function of the phase defined in Equation 20 above can be defined using Equations 22, 23, 24, and 25.

$$R_f(0 \leq \tau \leq NT) = \sqrt{\frac{\pi}{2}} R_f(0) \left[-\frac{5t^3}{3(NT)^3} + \frac{3t^2}{(NT)^2} - 1\right] \left(\frac{radians}{second}\right)^2 \quad \text{Equation 22}$$

and $$R_f(NT \leq \tau \leq 2NT) = \sqrt{\frac{\pi}{2}} R_f(0) \left[\frac{5t^3}{6(NT)^3} - \frac{9t^2}{2(NT)^2} + \frac{15t}{2(NT)} - \frac{7}{2}\right] \left(\frac{radians}{second}\right)^2 \quad \text{Equation 23}$$

and $$R_f(2NT \leq \tau \leq 3NT) = \sqrt{\frac{\pi}{2}} R_f(0) \left[\frac{t^3}{6(NT)^3} - \frac{3t^2}{2(NT)^2} + \frac{9t}{2(NT)} - \frac{9}{2}\right] \left(\frac{radians}{second}\right)^2 \quad \text{Equation 24}$$

-continued and $$R_f(\tau > 3NT) = 0 \left(\frac{radians}{second}\right)^2 \quad \text{Equation 25}$$

The mean square power of the frequency variation of the output square-pulse sequence (y(t)) is defined using Equation 26.

$$R_f(\tau = 0) = 2PT^{-2}K^2N^3 \left(\frac{radians}{second}\right)^2 \quad \text{Equation 26}$$

Referencing Equation 21 above, it can be seen that the power spectral density of the third-order noise is centered at a frequency (e.g., an oscillator frequency) of the source sequence in the frequency domain. To vary the shape and/or the location of the power spectral density in the frequency domain (e.g., adjust the power spectral density away from the center of the frequency), the output square-pulse sequence (y(t)) is multiplied by one or more square-pulse subcarriers ($c_i(t)$) (sometimes referred to as a "binary offset carrier" (BOC)). In the illustrated example of FIG. 2, the subcarriers are generated by example subcarrier generators 260. A subcarrier (c(t)) generated by the subcarrier generator 260 may be defined by Equation 27.

$$c(t)=A*sq(t,f_s)=A*\text{sign}[\sin(2\pi*f_s*t)] \quad \text{Equation 27:}$$

In Equation 27 above, the amplitude (A) is a constant amplitude that will modify the amplitude of the output square-pulse sequence (y(t)). The function (sq(t, $f_s$)) represents a subcarrier of square-pulse at frequency ($f_s$) that will frequency up-convert the power spectral density of the output square-pulse sequence (y(t)) to either side of the original center frequency in the frequency domain of the source sequence. In the illustrated example, the frequency ($f_s$) of the subcarrier is set to a value greater than the rate of the output square-pulse sequence (y(t)). In the illustrated example, the sign operation on the trigonometric (sin) function on the same frequency ($f_s$) is used to generate the subcarrier of square-pulse.

BOC modulation includes multiplying an input sequence (e.g., the output square-pulse sequence (y(t))) by a rectangular subcarrier (c(t)) of a frequency ($f_s$) greater than or equal to the frequency of the input sequence. In the illustrated example, it is assumed that there is an integer number of periods of subcarrier square waves in each T-second period of the input sequence (y(t)) while the input sequence (y(t)) is constant. BOC modulation facilitates circumventing interference by using square-pulse modulated sequences, which have a sinc function shaped spectrum in the frequency domain. Thus, square-pulse sequences, such as binary phase-shift keys, have most of their spectral energy concentrated around the center frequency (e.g., of the input sequence) and two main spectral lobes moved to either side of the center frequency. Accordingly, multiplying the input sequence (y(t)) by a rectangular subcarrier (c(t)) at frequency ($f_s$) (1) varies the shape of the frequency spectrum of the input sequence (y(t)), and (2) up-converts the frequency of the frequency spectrum of the input sequence (y(t)). Furthermore, by multiplying the input sequence (y(t)) by a constant amplitude (A), the constant term embedded in the subcarrier (c(t)) further varies the amplitude of the input sequence (Y(t)).

In the illustrated example of FIG. 2, the collection of square-pulse subcarriers generated by the subcarrier generators 260 are provided to respective example multipliers 265. The example multipliers 265 multiply the input subcarrier and the output square-pulse sequence (y(t)). The outputs of the multipliers 265 are summed by the adder 270 to form the example controlled scramble sequence 275 (z(t)). The controlled scramble sequence 275 (z(t)) may be defined in the time-domain using Equation 28.

$$z(t)=y(t)*\Sigma_{i=1}^{n}c_i(t)=y(t)*\Sigma_{i=1}^{n}A_i\mathrm{sign}[\sin(2\pi*f_{s,i}*t)] \quad \text{Equation 28:}$$

In Equation 28 above, each subcarrier ($c_i(t)$) is associated with a respective subcarrier frequency ($f_{s,i}$) and is associated with a respective amplitude ($A_i$). With reference to Equation 28, if the respective amplitudes ($A_i$) are set to $$\left(\frac{1}{n}\right)$$

and the respective subcarrier frequencies are set to zero plus a phase addition of π divided by $$2\left(\frac{\pi}{2}\right),$$

the controlled scramble sequence (z(t)) 275 is equivalent to the output square-pulse sequence (y(t)) (e.g., no subcarriers are applied to the output (y(t)) of the filter 210).

With reference to Equations 21 and 28 above, the controlled scramble sequence (z(t)) is based on (e.g., can be controlled by) the values of the constant multiplier (K), the positive integer (N), the sampling period (T), the normalized input power (P), the amplitudes ($A_i$) of the respective subcarriers, and the respective subcarrier frequencies ($f_{s,i}$). In some examples, the operating parameters (K, N, T, P, $A_i$, $f_{s,i}$) may be preset. In some examples, the operating parameters (K, N, T, P, $A_i$, $f_{s,i}$) are configurable on demand.

In some examples, the apparatus 100 includes more than one controlled scramble generator 105. For example, the apparatus 100 may include a first example controlled scramble generator 105 and a second example controlled scramble generator 105. The first example controlled scramble generator 105 may be used to randomize or vary a phase of a function (e.g., a sinusoidal function). The second example controlled scramble generator 105 may be used to randomize or vary a frequency of the function. The first example controlled scramble generator 105 may be run in parallel or in sequence with the second example controlled scramble generator 105.

While an example manner of implementing the controlled scramble generator 105 of FIG. 1 is illustrated in FIG. 2, one or more of the elements, processes and/or devices illustrated in FIG. 2 may be combined, divided, re-arranged, omitted, eliminated, and/or implemented in any other way. Further, the example input randomizer 205, the example filter 210, the example N-stage shift register 215, the example multiplier 220, the example N-stage shift register 225, the example multiplier 230, the example N-stage shift register 235, the example adder 240, the example accumulator 245, the example accumulator 250, the example multiplier 255, the example subcarrier generator(s) 260, the example multiplier(s) 265, the example adder 270 and/or, more generally, the example controlled scramble generator 105 of FIG. 2 may be implemented by hardware, software, firmware and/or any combination of hardware, software and/or firmware. Thus, for example, any of the example input randomizer 205, the example filter 210, the example N-stage shift register 215, the example multiplier 220, the example N-stage shift register 225, the example multiplier 230, the example N-stage shift register 235, the example adder 240, the example accumulator 245, the example accumulator 250, the example multiplier 255, the example subcarrier generator(s) 260, the example multiplier(s) 265, the example adder 270 and/or, more generally, the example controlled scramble generator 105 of FIG. 2 could be implemented by one or more analog or digital circuit(s), logic circuits, programmable processor(s), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example input randomizer 205, the example filter 210, the example N-stage shift register 215, the example multiplier 220, the example N-stage shift register 225, the example multiplier 230, the example N-stage shift register 235, the example adder 240, the example accumulator 245, the example accumulator 250, the example multiplier 255, the example subcarrier generator(s) 260, the example multiplier(s) 265, the example adder 270 and/or, more generally, the example controlled scramble generator 105 of FIG. 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example controlled scramble generator 105 of FIG. 2 may include one or more elements, processes, and/or devices in addition to, or instead of, those illustrated in FIG. 2, and/or may include more than one of any or all of the illustrated elements, processes, and devices.

Figure 3:
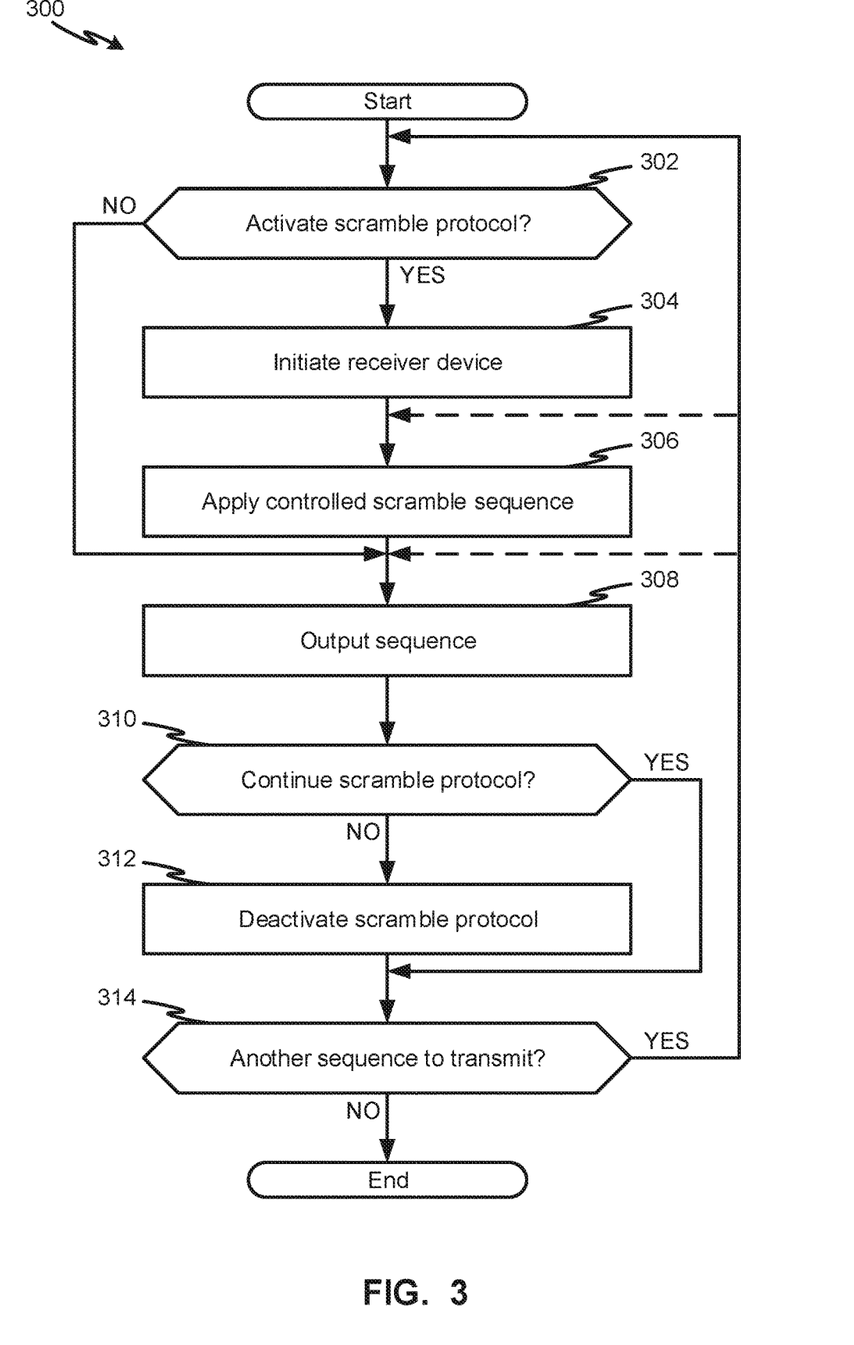
FIG. 3 is a flowchart representative of an example method that may be executed by the example apparatus of FIG. 1 to transmit a sequence.
Figure 4:
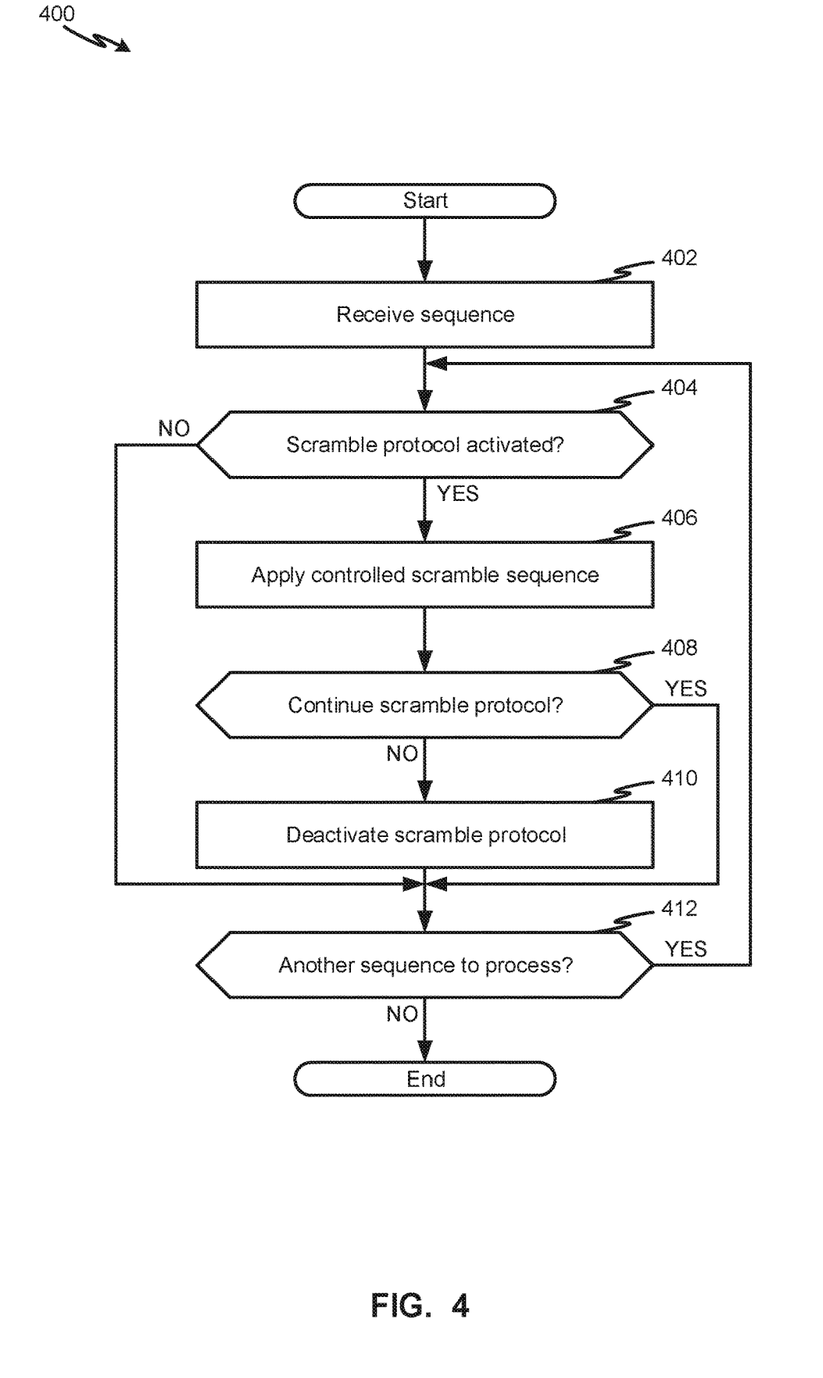
FIG. 4 is a flowchart representative of an example method that may be executed by the example apparatus of FIG. 1 to process a received sequence.
Figure 5:
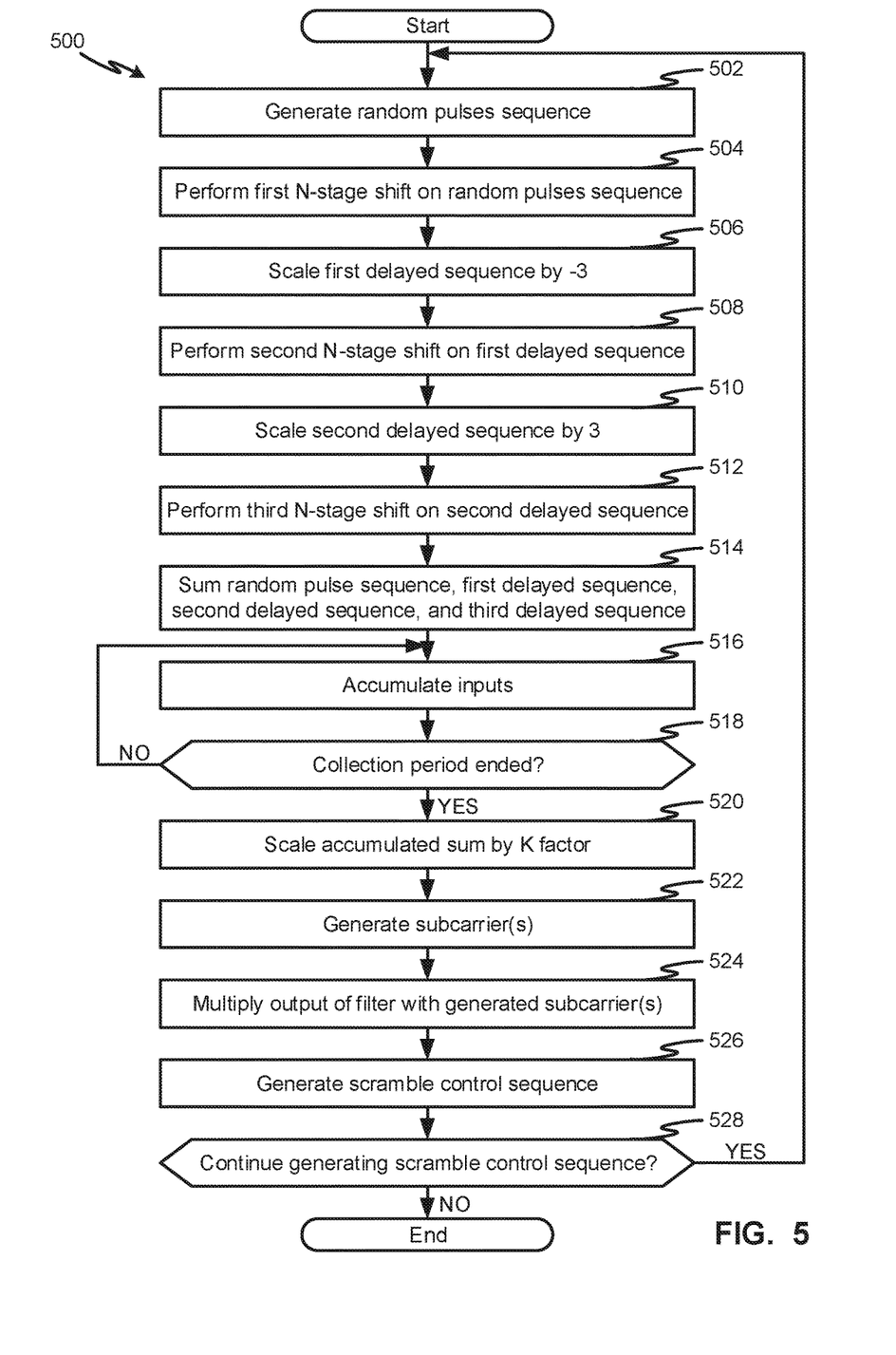
FIG. 5 is a flowchart representative of an example method that may be executed by the example controlled scramble generator of FIGS. 1 and/or 2 to generate a controlled scramble sequence.

Flowcharts representative of example methods for implementing the apparatus 100 of FIGS. 1 and/or 2 are shown in FIGS. 3-5. In these examples, the methods may be implemented using machine readable instructions that comprise a program for execution by a processor such as the processor 612 shown in the example processor platform 600 discussed below in connection with FIG. 6. The program(s) may be embodied in software stored on a tangible computer readable storage medium such as a CD-ROM, a floppy disk, a hard drive, a digital versatile disk (DVD), a Blu-ray disk, or a memory associated with the processor 612, but the entire program(s) and/or parts thereof could alternatively be executed by a device other than the processor 612, and/or embodied in firmware or dedicated hardware. Further, although the example program(s) is/are described with reference to the flowcharts illustrated in FIGS. 3-5, many other methods of implementing the apparatus 100 may alternatively be used. For example, the order of execution of the blocks may be changed, and/or some of the blocks described may be changed, eliminated, or combined.

As mentioned above, the example methods of FIGS. 3-5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM), and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer-readable storage medium" and "tangible machine-readable storage medium" are used interchangeably. Additionally or alternatively, the example methods of FIGS. 3-5 may be implemented using coded instructions (e.g., computer and/or machine-readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer-readable storage device and/or storage disk and to exclude propagating signals and to exclude transmission media. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

FIG. 3 is a flowchart representative of an example method 300 that may be executed to implement the example apparatus 100 of FIGS. 1 and/or 2 to transmit a sequence. The method 300 of FIG. 3 begins at block 302 when the example protocol manager 110 (FIG. 1) determines whether to activate the scramble protocol. For example, a user may provide a password to initiate the scramble protocol. If, at block 302, the example protocol manager 110 determines not to activate the scramble protocol, then, at block 308, the external interface 125 (FIG. 1) transmits an unscrambled source sequence.

If, at block 302, the example protocol manager 110 determines to activate the scramble protocol (e.g., the password is accepted by the protocol manager 110), then, at block 304, the protocol manager 110 initiates a receiving device. For example, the protocol manager 110 may synchronize time with the receiving device, may instruct the receiving device when to apply a controlled scramble sequence, how to configure the operating parameters (K, N, T, P, $A_i$, $f_{s,i}$), etc. At block 306, the example sequence modifier 115 (FIG. 1) modifies a source sequence by applying the controlled scramble sequence. In the illustrated example, the sequence modifier 115 applies the controlled scramble sequence in response to an instruction received from the protocol manager 110. For example, the sequence modifier 115 may receive a source sequence for transmitting and a controlled scramble sequence and only modify the source sequence with the controlled scramble sequence based on information indicative of applying the controlled scramble sequence. At block 308, the example external interface 125 outputs the scrambled sequence to the receiving device.

At block 310, the example protocol manager 110 determines whether to continue the scramble protocol. For example, the protocol manager 110 may activate the scramble protocol for a predetermined number of sequences (e.g., transmitting one sequence and receiving one sequence), for a predetermined period of time (e.g., five minutes), for a continuous session (e.g., until the user deactivates the scramble protocol), etc. If, at block 310, the protocol manager 110 determines not to continue the scramble protocol, then, at block 312, the protocol manager 110 deactivates the scramble protocol. For example, the protocol manager 110 may instruct the sequence modifier 115 to stop applying the controlled scramble sequence, may instruct a receiving device to stop applying the controlled scramble sequence, etc. At block 314, the apparatus 100 determines whether there is another sequence to transmit. If, at block 314, the apparatus 100 determines that there is another sequence to transmit, control returns to block 302 to determine whether to activate the scramble protocol. In some examples, if the scramble protocol is activated and there is another sequence to transmit while the scramble protocol is activated (e.g., a predetermined period of time has not expired, etc.), control may return to block 306 to cause the sequence modifier 115 to apply the controlled scramble sequence. In some examples, if the scramble protocol is deactivated and there is another sequence to transmit while the scramble protocol is deactivated (e.g., an unauthorized user is accessing the transmitter), control may return to block 308 to cause the sequence modifier to not apply the controlled scramble sequence and to send an unscrambled sequence. Otherwise, the example method 300 of FIG. 3 ends. Additionally or alternatively, the example method 300 of FIG. 3 may run continuously and, thus, control may return to block 302 to wait to determine whether to activate the scramble protocol.

FIG. 4 is a flowchart representative of an example method 400 that may be executed to implement the example apparatus 100 of FIGS. 1 and/or 2 to process a received sequence. The method 400 of FIG. 4 begins at block 402 when the example external interface 125 (FIG. 1) receives a sequence. At block 404, the example protocol manager 110 (FIG. 1) determines whether the scramble protocol is activated. For example, the protocol manager 110 may record when and/or a duration for how long the scramble protocol is activated based on instructions received from the transmitting device. If, at block 404, the protocol manager 110 determines that the scramble protocol is not activated, control proceeds to block 412 to determine whether there is another received sequence to process.

If, at block 404, the protocol manager 110 determines that the scramble protocol is activated, then, at block 406, the example sequence modifier 115 (FIG. 1) modifies the received sequence by applying the controlled scramble sequence. In the illustrated example, the sequence modifier 115 applies the controlled scramble sequence in response to an instruction received from the protocol manager 110. At block 408, the protocol manager 110 determines whether to continue applying the controlled scramble sequence. For example, the protocol manager 110 may deactivate the scramble protocol after a number of sequences have been transmitted and/or received, after an interval of time, at the end of a session, etc. If, at block 408, the protocol manager 110 determines to continue the scramble protocol, control proceeds to block 412 to determine whether there is another sequence to process. If, at block 408, the protocol manager 110 determines to stop the scramble protocol, then, at block 410, the protocol manager 110 deactivates the scramble protocol. For example, the protocol manager 110 may instruct the sequence modifier 115 to stop applying the controlled scramble sequence, etc. At block 412, the apparatus 100 determines whether there is another sequence to process. If, at block 412, the apparatus 100 determines that there is another sequence to process (e.g., another sequence is received for processing), control returns to block 404 to determine whether the scramble protocol is activated and the controlled scramble sequence is to be applied to the received sequence. Otherwise, the example method 400 of FIG. 4 ends. Additionally or alternatively, the example method 400 of FIG. 4 may run continuously and, thus, control may return to block 402 to wait to receive a sequence.

FIG. 5 is a flowchart representative of an example method 500 that may be executed to implement the example controlled scramble generator 105 of FIGS. 1 and/or 2 to generate a controlled scramble sequence. The method 500 of FIG. 5 begins at block 502 when the example input randomizer 205 (FIG. 2) generates a random pulse sequence ($x_0(t)$). For example, the input randomizer 205 may receive a seed from the example protocol manager 110 (FIG. 1) and generate the sequence of random pulses ($x_0(t)$). At block 504, the example filter 210 (FIG. 2) receives the random pulse sequence ($x_0(t)$) and the first example N-stage shift register 215 (FIG. 2) performs a first N-stage shift on the random pulse sequence ($x_0(t)$) to form the first delayed sequence ($x_1(t)$). At block 506, the example multiplier 220 (FIG. 2) scales the first delayed sequence by a factor (−3). At block 508, the second example N-stage shift register 225 (FIG. 2) performs a second N-stage shift register on the random pulse sequence ($x_0(t)$) to form the second delayed sequence ($x_2(t)$).

At block 510, the example multiplier 230 (FIG. 2) scales the second delayed sequence by a factor (3). At block 512, the third example N-stage shift register 235 (FIG. 2) performs a third N-stage shift register on the random pulse sequence ($x_0(t)$) to form the third delayed sequence ($x_3(t)$). At block 514, the example adder 240 (FIG. 2) sums the random pulse sequence ($x_0(t)$), the first delayed sequence ($x_1(t)$) scaled by a factor (−3), the second delayed sequence ($x_2(t)$) scaled by a factor (3), the third delayed sequence ($x_3(t)$) scaled by a factor (−1), and outputs the linear sum ($x(t)$).

At block 516, the example accumulator 245 (FIG. 2) sums the linear sum ($x(t)$) output by the adder 240, and the example accumulator 250 (FIG. 2) sums the output of the accumulator 245 until a period expires. If, at block 518, the accumulators 245, 250 determine that the collection period has not expired, control returns to block 516 to continue accumulating the inputs. If, at block 518, the accumulators 245, 250 determine that the collection period expired, then, at block 520, the example multiplier 255 scales the output of the accumulators 245, 250 by a factor (K) and outputs the output square-pulse sequence ($y(t)$). In response to the accumulators 245, 250 determining that the collection period has expired, the accumulators 245, 250 reset their sums to zero.

At block 522, the example subcarrier generator(s) 260 (FIG. 2) generate a collection of square-pulse subcarriers ($c_i(t)$) having respective frequencies ($f_{s,i}$) and amplitudes ($A_i$). At block 524, the example multiplier(s) 265 multiply the output square-pulse sequence ($y(t)$) and the respective square-pulse subcarriers ($c_i(t)$). At block 526, the example adder 270 (FIG. 2) generates the controlled scramble sequence ($z(t)$) 275 by adding the outputs of the multipliers 265. At block 528, the example controlled scramble generator 105 determines whether to continue generating the controlled scramble sequence. If, at block 528, the controlled scramble generator 105 determines to continue generating the controlled scramble sequence ($z(t)$) 275, control returns to block 502 to continue generating the random pulse sequence ($x_0(t)$). Otherwise, the example method 500 of FIG. 5 ends. Additionally or alternatively, the example method 500 of FIG. 5 may run continuously and, thus, control may return to block 502 to wait to generate another random pulse sequence.

Figure 6:
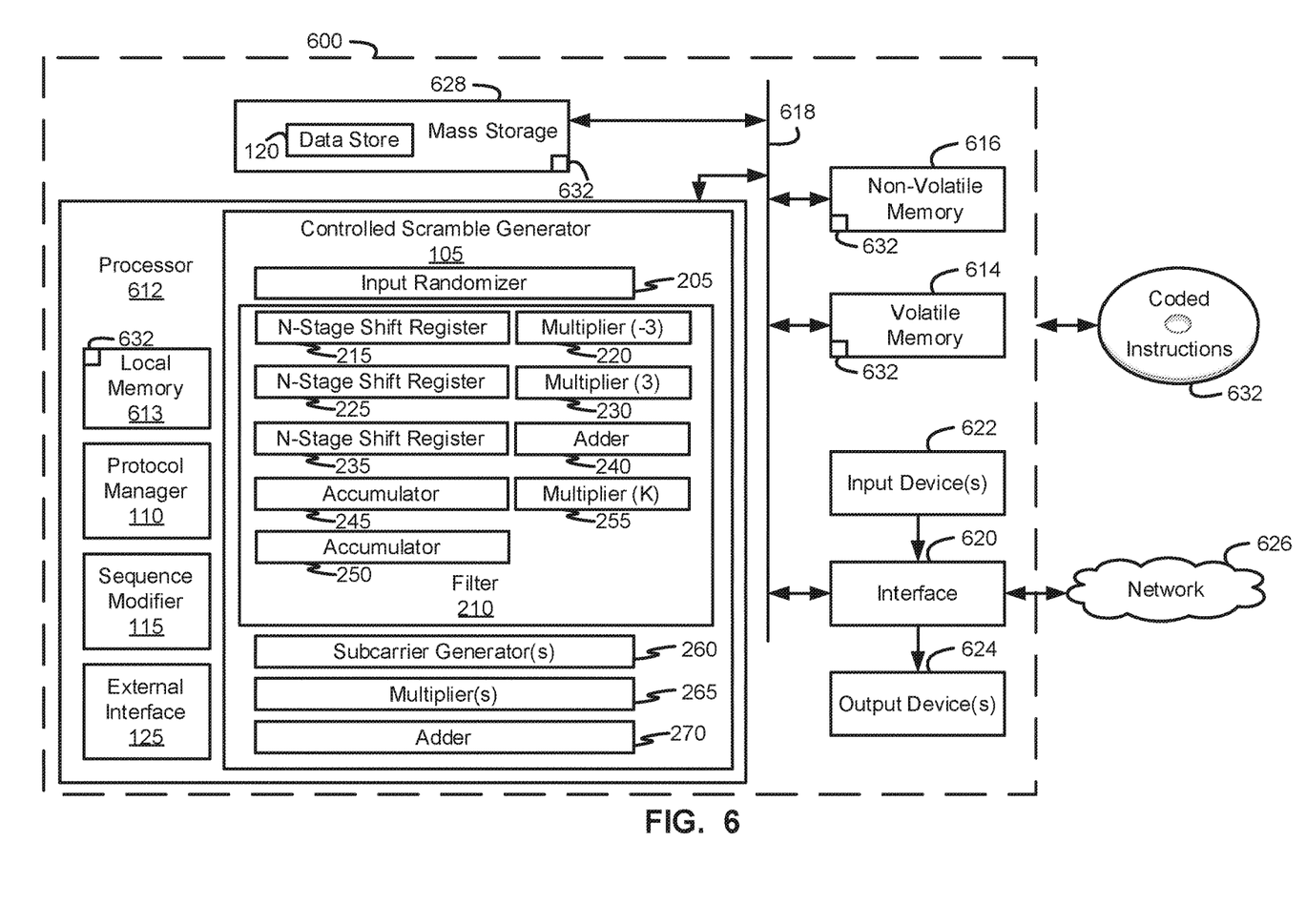
FIG. 6 is a block diagram of an example processing platform structured to execute machine-readable instructions to implement the methods of FIGS. 3-5, the example apparatus of FIG. 1 and/or the example controlled scramble generator of FIGS. 1 and/or 2.

FIG. 6 is a block diagram of an example processor platform 600 capable of executing the instructions to implement the methods of FIGS. 3-5 and the apparatus 100 of FIG. 1 and/or the controlled scramble generator 105 of FIGS. 1 and/or 2. The processor platform 600 can be, for example, a telecommunications device, a server, a personal computer, or any other type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer.

The processor 612 of the illustrated example includes a local memory 613 (e.g., a cache). The processor 612 of the illustrated example executes the instructions to implement the example controlled scramble generator 105, the example protocol manager 110, the example sequence modifier 115, the example external interface 125, the example input randomizer 205, the example filter 210, the example N-stage shift register 215, the example multiplier (−3) 220, the example N-stage shift register 225, the example multiplier (3) 230, the example N-stage shift register 235, the example adder 240, the example accumulator 245, the example accumulator 250, the example multiplier (K) 255, the example subcarrier generator(s) 260, the example multiplier(s) 265 and the example adder 270. The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and commands into the processor 612. The input device(s) can be implemented by, for example, an audio sensor, a microphone, a camera (still or video), a keyboard, a button, a mouse, a touchscreen, a track-pad, a trackball, isopoint, and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 620 of the illustrated example, thus, typically includes a graphics driver card, a graphics driver chip, or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626

(e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives. The example mass storage 628 implements the example data store 120.

Coded instructions 632 to implement the methods of FIGS. 3-5 may be stored in the mass storage device 628, in the volatile memory 614, in the non-volatile memory 616, and/or on a removable tangible computer readable storage medium such as a CD or DVD.

From the foregoing, it will be appreciated that the above disclosed methods, apparatus, and articles of manufacture facilitate generating a controlled scramble sequence to modify a sequence. For example, disclosed examples may apply the controlled scramble sequence to a source sequence to scramble the source sequence prior to transmission. In other examples, disclosed examples may apply the controlled scramble sequence to a received sequence to unscramble the sequence (e.g., reconstruct the source sequence). Disclosed examples further enable varying the shape and/or the location of the power spectral density of the source sequence to reduce the likelihood a transmitted sequence is intercepted and/or jammed.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a controlled scramble generator to generate a controlled random sequence based on one or more subcarriers and a square-pulse sequence, the square-pulse sequence based on a random pulse sequence processed by a multi-order sinusoidal noise function, the controlled scramble generator including:
a multiplier to determine the square-pulse sequence by multiplying a first sum and a constant, the first sum based on one or more sums determined during a time period, the one or more sums including a second sum based on at least the random pulse sequence, a first delayed sequence adjusted by a first constant factor, and a second delayed sequence adjusted by a second constant factor; and
a sequence modifier to form an output sequence by combining a source sequence with the controlled random sequence, the controlled random sequence to modify a characteristic of the source sequence in a frequency domain, at least one of the controlled scramble generator or the sequence modifier implemented with hardware.

2. The apparatus of claim 1, wherein the multi-order sinusoidal noise function is a phase noise function of at least third order or a frequency noise function of at least third order.

3. The apparatus of claim 2, wherein the phase noise function or the frequency noise function has a power spectral density asymptote of approximately −60 dB/decade.

4. The apparatus of claim 1, wherein the multiplier is a fourth multiplier, and further including:

three or more time delay stages including a first shift register to generate the first delayed sequence by delaying the random pulse sequence by a first quantity of time periods and a second shift register to generate the second delayed sequence by delaying the first delayed sequence by a second quantity of time periods; and
at least a first multiplier, a second multiplier, and a third multiplier, where the first through third multipliers scale outputs of the three or more time delay stages with constant factors, the constant factors including the first constant factor and the second constant factor.

5. The apparatus of claim 4, further including two or more accumulators to calculate the first sum during the time period, the two or more accumulators to be reset after the time period.

6. The apparatus of claim 1, further including:
at least a second multiplier and a third multiplier to adjust a power spectral density of the square-pulse sequence away from an oscillator frequency by multiplying the square-pulse sequence and the one or more subcarriers; and
an adder to determine the controlled random sequence by determining a third sum based on the square-pulse sequence modified by the one or more subcarriers.

7. A method comprising:
generating a controlled random sequence based on one or more subcarriers and a square-pulse sequence, the square-pulse sequence based on a random pulse sequence processed by a multi-order sinusoidal noise function, the square-pulse sequence generated by:
multiplying a first sum and a constant, the first sum based on one or more sums determined during a time period, the one or more sums including a second sum based on at least the random pulse sequence, a first delayed sequence adjusted by a first constant factor, and a second delayed sequence adjusted by a second constant factor; and
forming an output sequence by combining a source sequence with the controlled random sequence, the controlled random sequence to modify a characteristic of the source sequence in a frequency domain.

8. The method of claim 7, wherein the multi-order sinusoidal noise function is a phase noise function of at least third order or a frequency noise function of at least third order.

9. The method of claim 8, wherein the phase noise function or the frequency noise function has a power spectral density asymptote of approximately −60 dB/decade.

10. The method of claim 7, wherein generating the controlled random sequence includes generating the first delayed sequence and the second delayed sequence using three or more time delay stages, the first delayed sequence generated by delaying the random pulse sequence by a first quantity of time periods and the second delay sequence generated by delaying the first delayed sequence by a second quantity of time periods.

11. The method of claim 10, further including scaling outputs of the three or more time delay stages with constant factors, the constant factors including the first constant factor and the second constant factor.

12. The method of claim 11, further including calculating the one or more sums during a time period, the one or more sums based on the random pulse sequence and the outputs of the three or more time delay stages scaled with the constant factors during the time period.

13. The method of claim 7, wherein generating the controlled random sequence includes:

adjusting a power spectral density of the square-pulse sequence away from an oscillator frequency by multiplying the square-pulse sequence and the one or more subcarriers; and determining the controlled random sequence by determining a third sum based on the square-pulse sequence modified by the one or more subcarriers.

14. A non-transitory machine readable storage medium comprising instructions that, when executed, cause a machine to at least:

generate a controlled random sequence based on one or more subcarriers and a square-pulse sequence, the square-pulse sequence based on a random pulse sequence processed by a multi-order sinusoidal noise function, the machine to generate the square-pulse sequence by:

multiplying a first sum and a constant, the first sum based on one or more sums determined during a time period, the one or more sums including a second sum based on at least the random pulse sequence, a first delayed sequence adjusted by a first constant factor, and a second delayed sequence adjusted by a second constant factor; and form an output sequence by combining a source sequence with the controlled random sequence, the controlled random sequence to modify a characteristic of the source sequence in a frequency domain.

15. The non-transitory machine readable storage medium of claim 14, wherein the multi-order sinusoidal noise function is a phase noise function of at least third order or a frequency noise function of at least third order.

16. The non-transitory machine readable storage medium of claim 15, wherein the phase noise function or the frequency noise function has a power spectral density asymptote of approximately −60 dB/decade.

17. The non-transitory machine readable storage medium of claim 14, wherein the instructions, when executed, cause the machine to generate the first delayed sequence and the second delayed sequence using three or more time delay stages, the first delayed sequence generated by delaying the random pulse sequence by a first quantity of time periods and the second delay sequence generated by delaying the first delayed sequence by a second quantity of time periods.

18. The non-transitory machine readable storage medium of claim 17, wherein the instructions, when executed, cause the machine to scale outputs of the three or more time delay stages with constant factors, the constant factors including the first constant factor and the second constant factor.

19. The non-transitory machine readable storage medium of claim 18, wherein the instructions, when executed, cause the machine to calculate the one or more sums during a time period, the one or more sums based on the random pulse sequence and the outputs of the three or more time delay stages scaled with the constant factors during the time period.

20. The non-transitory machine readable storage medium of claim 14, wherein the instructions, when executed, cause the machine to generate the controlled random sequence by:

adjusting a power spectral density away of the square-pulse sequence from an oscillator frequency by multiplying the square-pulse sequence and the one or more subcarriers; and determining the controlled random sequence by determining a third sum based on the square-pulse sequence modified by the one or more subcarriers.

* * * * *